US008583293B2

(12) United States Patent
Soronda

(10) Patent No.: US 8,583,293 B2
(45) Date of Patent: Nov. 12, 2013

(54) FLIGHT CONTROL SURFACE ACTUATION FORCE FIGHT MITIGATION SYSTEM AND METHOD

(75) Inventor: Vojislav Soronda, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 988 days.

(21) Appl. No.: 12/614,966

(22) Filed: Nov. 9, 2009

(65) Prior Publication Data

US 2011/0108671 A1 May 12, 2011

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl.
USPC .............................. 701/3; 244/99.2; 244/99.4

(58) Field of Classification Search
USPC ........... 244/99.2, 99.3, 99.4, 99.5, 99.6, 99.9, 244/23 A, 23 B, 195
See application file for complete search history.

(56) References Cited

U.S. PATENT DOCUMENTS

| | | | | |
|---|---|---|---|---|
| 3,805,235 | A * | 4/1974 | Foster et al. | 714/797 |
| 3,968,730 | A * | 7/1976 | Lionet | 91/171 |
| 4,800,798 | A | 1/1989 | Boldrin et al. | |
| 5,129,310 | A | 7/1992 | Ma | |
| 5,493,497 | A | 2/1996 | Buus | |
| 5,515,282 | A * | 5/1996 | Jackson | 701/4 |
| 5,550,731 | A * | 8/1996 | Jackson | 700/4 |
| 5,670,856 | A | 9/1997 | Le et al. | |
| 5,806,805 | A | 9/1998 | Elbert et al. | |
| 6,644,332 | B1 | 11/2003 | Winkler | |
| 6,935,596 | B2 | 8/2005 | Walter | |
| 7,098,619 | B2 | 8/2006 | Stridsberg | |
| 7,104,053 | B2 | 9/2006 | Gast | |
| 8,245,967 | B2 * | 8/2012 | Kirkland | 244/76 R |
| 2010/0127132 | A1 * | 5/2010 | Kirkland | 244/76 R |

* cited by examiner

*Primary Examiner* — Tien Dinh
*Assistant Examiner* — Michael A Fabula
(74) *Attorney, Agent, or Firm* — Ingrassia Fisher & Lorenz, P.C.

(57) ABSTRACT

A system and method of mitigating a force fight between hydraulically-operated actuators that are coupled to a single flight control surface is provided. The differential fluid pressure across each hydraulically-operated actuator is sensed. The position of a user interface is sensed using a plurality of user interface position sensors. Flight control surface position is sensed using one or more position sensors. The sensed differential pressures, the sensed user interface positions, and the sensed flight control surface position are used to generate a plurality of substantially equal actuator commands.

12 Claims, 7 Drawing Sheets

350
332
332
332
402
1/3
416
406-1
406-2
406-3
408-1
408-2
408-3
GAIN
412-1
412-2
412-3
412-4
412-5
406-4
352-1
352-2
352-3
314
314
314
404
418
406-5
406-6
406-7
414-1
414-2
414-3
334
334
334

FLIGHT CONTROL SURFACE ACTUATION FORCE FIGHT MITIGATION SYSTEM AND METHOD

TECHNICAL FIELD

The present invention generally relates to aircraft flight control systems and, more particularly, an aircraft flight control system and method that mitigates any potential force fights between actuators coupled to the same flight control surface.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become jammed, uncontrollably free, or otherwise inoperable. Thus, some flight control surface actuation systems are implemented with redundant (e.g., two or more) actuators coupled to a single flight control surface.

Flight control surface actuation systems that have two or more actuators coupled to a single flight control surface typically implement one of two operational configurations—an active-standby configuration or an active-active configuration. With the active-standby (or active-standby-standy) configuration, one actuator is actively powered while the other one (or two) are in a standby mode. With the active-active (or active-active-active) operational configuration, all of the actuators are simultaneously powered. This latter operational configuration provides certain advantages over the active-standby (or active-standby-standy) configuration. Specifically, it allows each individual actuator to be sized relatively smaller as compared to the actuators used to implement the active-standby (active-standby-standby) configuration. Additionally, there is no need for any redundancy management. It is noted, however, that the active-active (or active-active-active) operational mode does present the potential for a resultant force fight between the active actuators.

The force-fight results from the fact that the actuators, position sensors, control electronics, and mechanical components have independent, unique tolerances. Although installation and surface position rigging can reduce some of the differences between two channels, these differences can result in one channel attempting to position the flight control surface to a different position than the other channel(s). The resultant effect is torsion moment on the flight control surface as the two neighbouring channels compete with each other to move the flight control surface to different positions. This torsion moment introduces stress to the flight control surface and a resulting fatigue accumulation. Designing flight control surfaces to withstand the worst-case stress and fatigue that could occur in the active-active (or active-active-active) operational configuration would result in additional weight, and associated its costs.

Hence, there is a need for a system and method of preventing, or at least mitigating, the resultant force fights that can occur between actuators when flight control surface actuation system channels are configured in an active-active (or active-active-active) operational configuration without relying on undesirably heavy flight control surfaces. The present invention addresses at least this need.

BRIEF SUMMARY

In one embodiment, a flight control surface actuation system includes a plurality of differential pressure (DP) sensors, a plurality of user interface sensors, a position sensor, and a control. Each DP sensor is configured to sense a differential fluid pressure across a hydraulically-operated actuator and supply a differential pressure signal representative of the sensed differential fluid pressure. Each user interface sensor is configured to sense movement of a user interface and supply a position command signal representative of the sensed movement. The position sensor is configured to sense flight control surface position and supply a flight control surface position signal representative of the sensed flight control surface position. The control is coupled to receive the differential pressure signals, the position command signals, and the flight control surface position signal, the control is configured to process these signals and generate a plurality of substantially equal actuator commands.

In another embodiment, a flight control surface actuation system includes a plurality of hydraulically-operated actuators, a plurality of differential pressure (DP) sensors, an inceptor, a plurality of user interface sensors, and a control. Each actuator is coupled to receive an actuator command and is adapted to receive a flow of hydraulic fluid. Each actuator is configured, upon receipt of the actuator command, to move a flight control surface to a position. Each DP sensor is configured to sense a differential fluid pressure across one of the hydraulically-operated actuator and supply a differential pressure signal representative of the sensed differential fluid pressure. The inceptor is configured to receive user input and is configured, upon receipt of the user input, to move to a control position. Each user interface sensor is configured to sense movement of the inceptor and supply a position command signal representative of the control position. The position sensor is configured to sense the position of the flight control surface and supply a flight control surface position signal representative thereof. The control is coupled to receive the differential pressure signals, the position command signals, and the flight control surface position signal. The control is configured to process these signals and generate a plurality of substantially equal actuator commands for supply to the actuators.

In yet a further embodiment, a method of mitigating a force fight between hydraulically-operated actuators that are coupled to a single flight control surface includes sensing differential fluid pressure across each hydraulically-operated actuator, sensing a position of a user interface using a plurality of user interface position sensors, and sensing flight control surface position using one or more position sensors. A plurality of substantially equal actuator commands is generated from the sensed differential pressures, the sensed user interface positions, and the sensed flight control surface position.

Furthermore, other desirable features and characteristics of the flight control surface actuation system and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
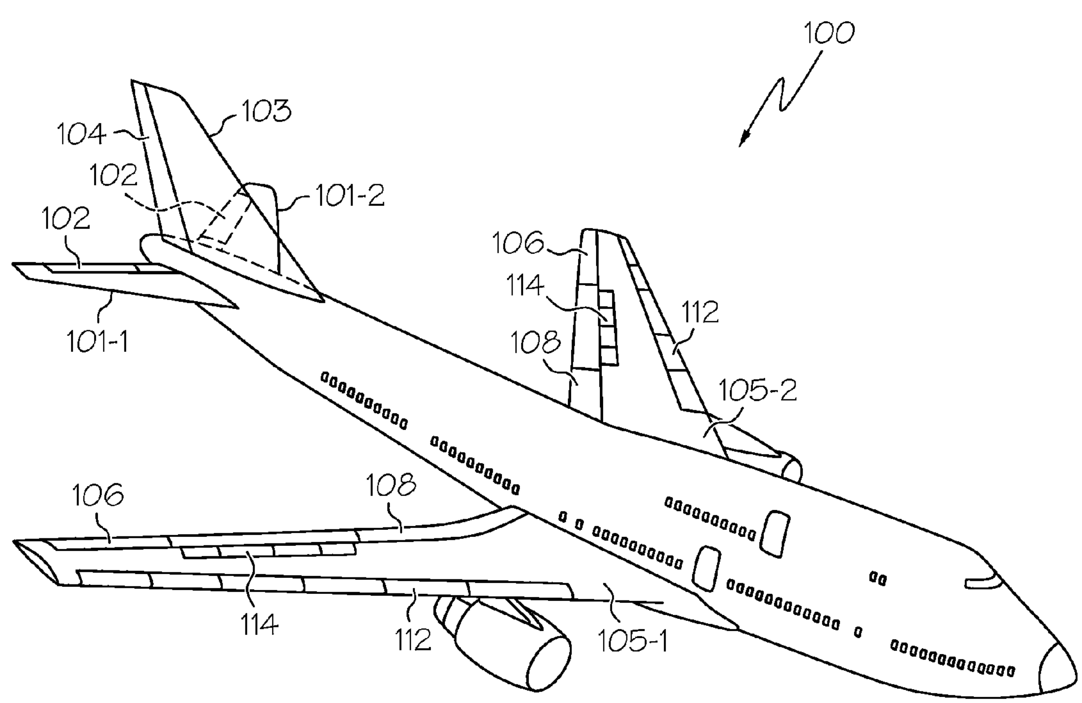
FIG. 1 is a plan view of an exemplary aircraft depicting primary and secondary flight control surfaces.

Turning first to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
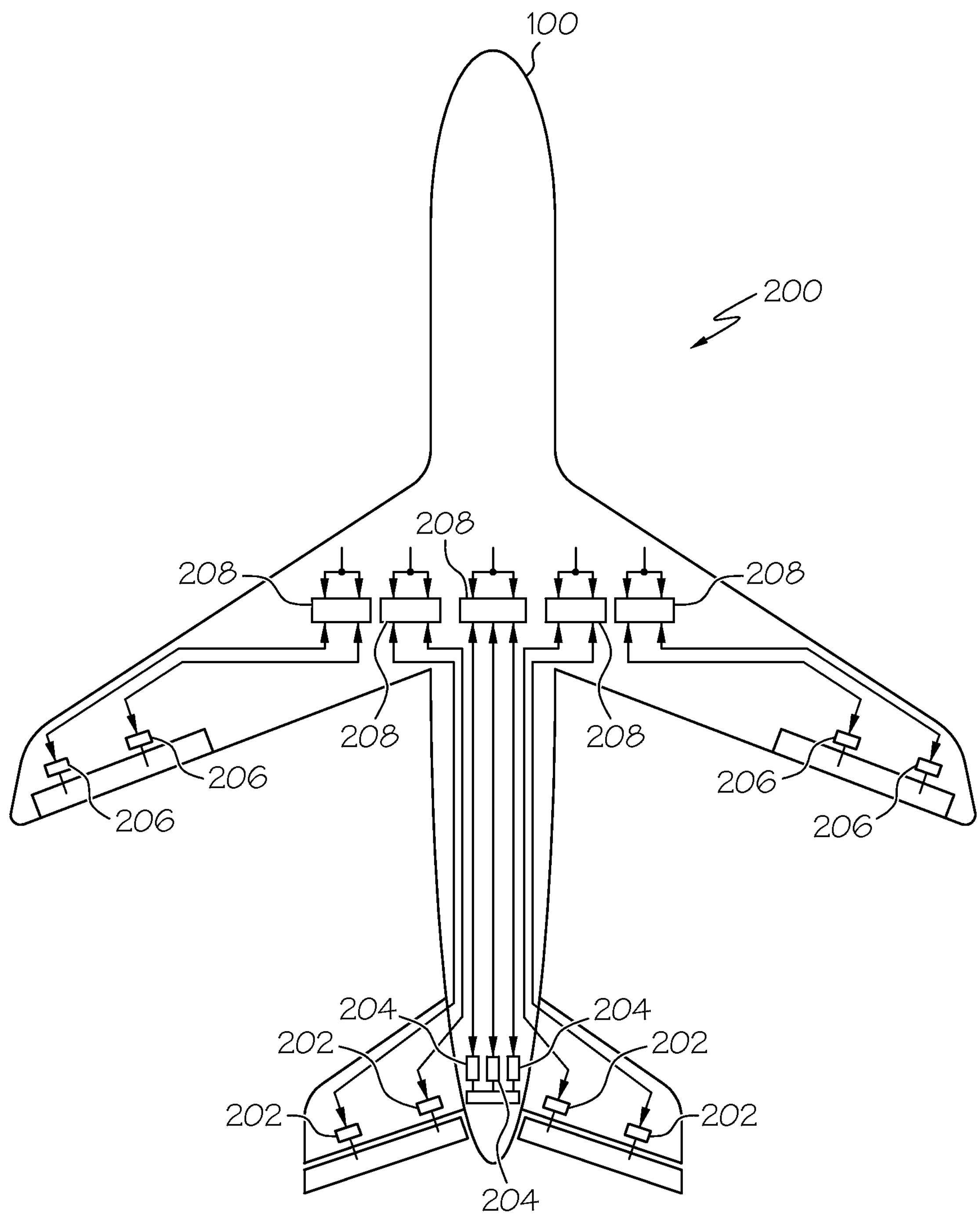
FIG. 2 is a schematic diagram depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes a plurality of primary flight control surface actuator assemblies, which include elevator actuator assemblies 202, rudder actuator assemblies 204, and aileron actuator assemblies 204, and a plurality of controls 208.

Before proceeding further, it is noted that the flight control surface actuation system 200 additionally includes a plurality of secondary control surface actuator assemblies, such as flap actuator assemblies, slat actuator assemblies, and spoiler actuator assemblies. However, the operation of the secondary flight control surfaces 108-114 and the associated actuator assemblies is not needed to fully describe and enable the present invention. Thus, for added clarity, ease of description, and ease of illustration, the secondary flight control surfaces and actuator assemblies are not depicted in FIG. 2, nor are these devices further described.

Returning now to the description, it will be appreciated that the flight control surface actuation system 200 may be implemented using various numbers and types of primary flight control surface actuator assemblies 202-206. In addition, the number and type of primary flight control surface actuator assemblies 202-206 per primary flight control surface 102-106 may be varied. In the depicted embodiment, however, the flight control surface actuation system 200 is implemented such that two primary flight control surface actuator assemblies 202 are coupled to each elevator 102, three primary flight control surface actuator assemblies 204 are coupled to the rudder 104, and two primary flight control surface actuator assemblies 206 are coupled to each the aileron 106. Moreover, each primary flight control surface actuator is implemented using a hydraulic actuator assembly 202-206. It will be appreciated that this number of primary flight control surface actuator assemblies 202-206 is merely exemplary of a particular embodiment, and that other numbers of actuator assemblies 202-206 could also be used.

The flight control surface actuation system 200 may also be implemented with various numbers of controls 208. However, the flight control surface actuation system 200 is preferably implemented such that the primary flight control surface actuator assemblies 202-206 that are coupled to a common flight control surface 102-106 are controlled by at least one control 208. Thus, at least in the depicted embodiment, the flight control surface actuation system 200 includes five controls 208. It will be appreciated that, although the controls 208 are depicted as being disposed remote from the associated actuator assemblies 202-206, some or all of the actuator controls 208 could be collocated or integral with the associated actuator assemblies 202-206.

Figure 6:
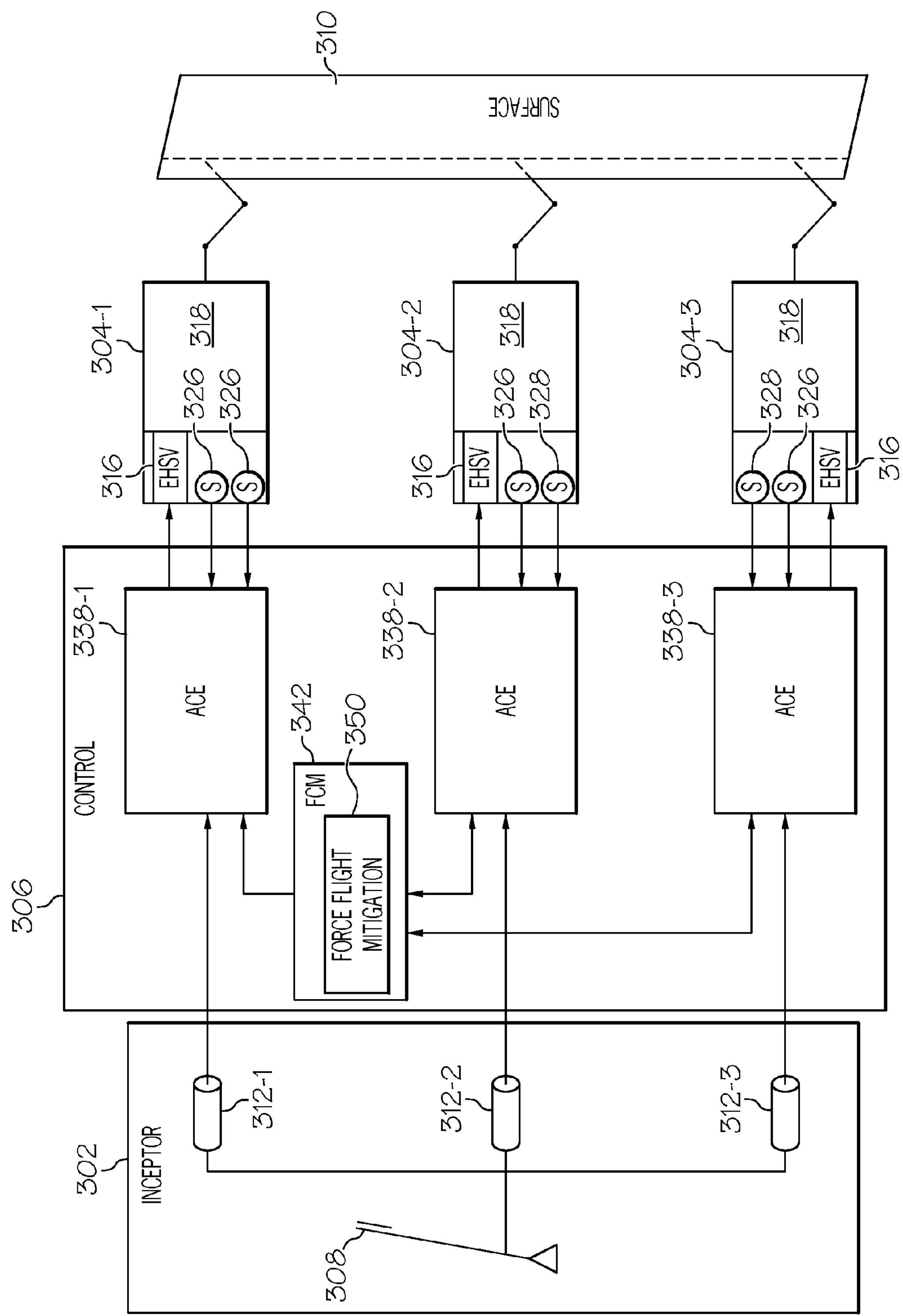
FIG. 6 is a function block diagram of another portion of the flight control actuation system of FIG. 2 that is associated with a single primary flight control surface.

No matter its specific implementation, each control 208 is preferably configured, during normal system operation, to operate in an active-active (or active-active-active) mode. Thus, each control 208 is configured to receive flight control surface position commands from one or more non-illustrated external systems, such as one or more pilot controls. In response to the flight control surface position commands, each actuator control 208 appropriately controls its associated plurality of flight control surface actuator assemblies 202-206 to supply a force to its associated flight control surface 102-106 that moves the associated flight control surface 102-106 to the commanded position. The controls 208 are additionally each configured to eliminate, or at least mitigate, any potential force fight that might otherwise occur between its associated flight control surface actuator assemblies 202-206. It will be appreciated that the controls 208 may be variously configured to implement this functionality. However, particular preferred configurations are depicted in FIGS. 3 and 6, and will each be described.

Figure 3:
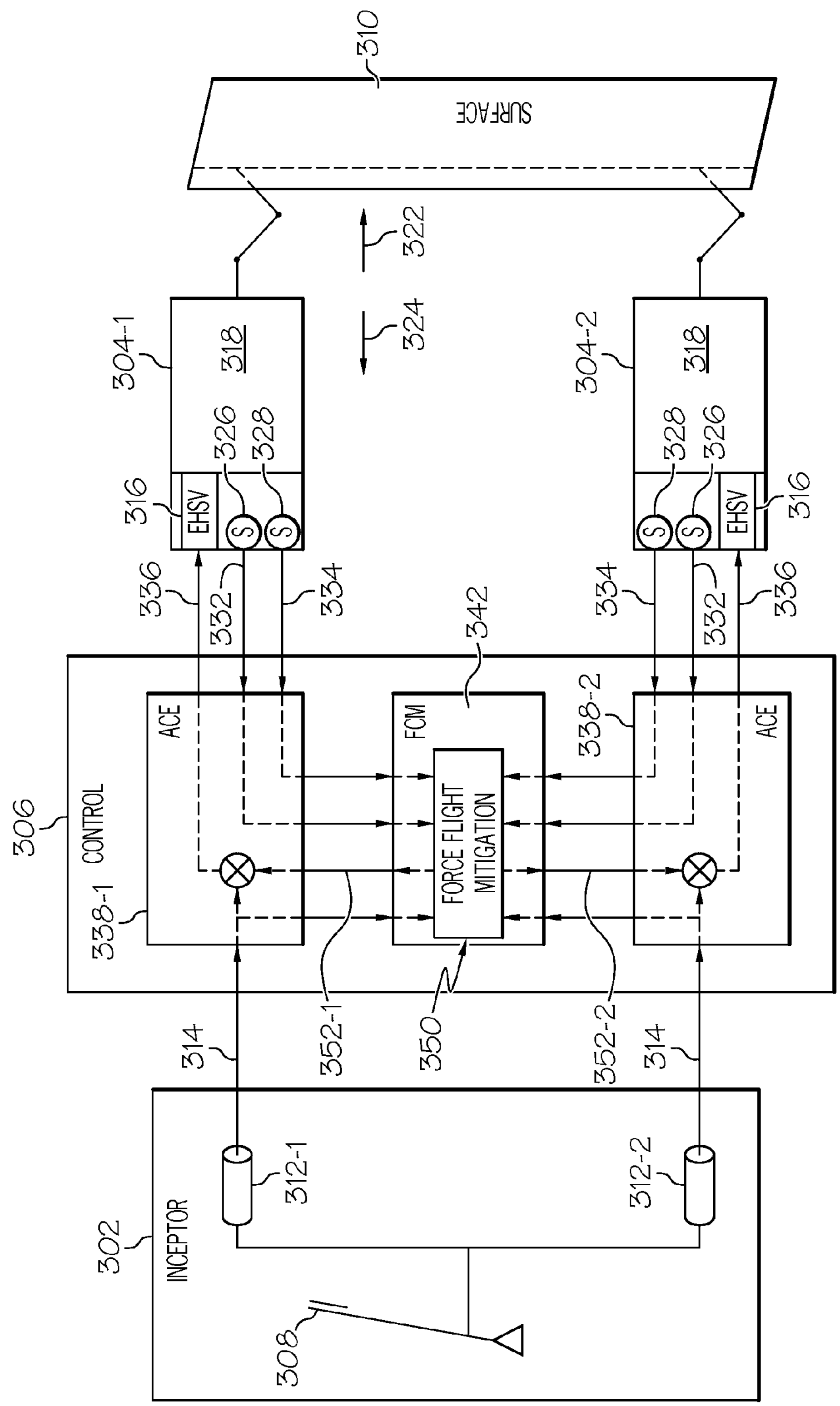
FIG. 3 is a function block diagram of a portion of the flight control actuation system of FIG. 2 that is associated with a single primary flight control surface.

Referring first to FIG. 3, a functional block diagram of a portion of the flight control actuation system associated with a single primary flight control surface is depicted and includes an inceptor system 302, a plurality of actuator assemblies 304 (e.g., 304-1, 304-2), and a control 306. The inceptor system 302 includes user interface 308 and a plurality of user interface sensors 312 (e.g., 312-1, 312-2). The user interface 308 is configured to move in response to an input force supplied from, for example, a pilot. The user interface position sensors 312 are configured to sense the position of the user interface 308, and supply position command signals 314 representative of the sensed user interface position. It will be appreciated that the user interface 308 may be implemented using any one of numerous user interface configurations including, for example, a side stick, a yoke, or a rudder pedal, just to name a few, and may be implemented as an active device or a passive device. It will additionally be appreciated that the user interface sensors 312 may be variously configured. For example, the user interface sensors 312 may be implemented using any one of numerous types of force sensors, or position sensor, just to name a few. No matter its specific implementation, the inceptor system 302 supplies the position command signals 314 to the control 306. As will be described further below, the control 306 is configured to generate and supply actuator commands to each of the actuators 304.

The actuator assemblies 304, as described above, are each implemented as hydraulic actuator assemblies and are coupled to the same flight control surface 310. The hydraulic actuator assemblies 304 may be implemented using any one of numerous types of hydraulic actuator assemblies. In the depicted embodiment, the hydraulic actuator assemblies 304 each include a servo control valve 316 and an actuator 318. The servo control valve 316, which is implemented as an electro-hydraulic servo valve (EHSV) in the depicted embodiment, is configured, when appropriately energized, to control the supply of pressurized hydraulic fluid to and from the actuator 318. The actuator 318, depending on the position of the EHSV 316, and in response to the pressurized hydraulic fluid, moves in either an extend direction 322 or a retract direction 324, and thereby supplies a force to the flight control surface 310. It will be appreciated that the hydraulic actuator assemblies 304 could additionally be implemented as electrohydraulic actuator assemblies (EHAs), which do not include servo valves.

The actuator assemblies 304 additionally include a plurality of sensors. In the depicted embodiment, these sensors include a differential pressure (DP) sensor 326 and a position sensor 328. It will be appreciated, however, that the actuator assemblies 304 could include additional sensors if needed or desired. Each DP sensor 326 is configured to sense the differential fluid pressure across its associated actuator 318 (e.g., between to hydraulic fluid actuator chambers), and supply a differential pressure signal 332 representative of the sensed differential fluid pressure to the control 306. The DP sensors 326, as may be appreciated, may be implemented using any one of numerous types of suitable pressures or DP sensors now known or developed in the future. In those embodiments in which pressure sensors are used, it will be appreciated that each pressure sensor senses the fluid pressure in one hydraulic fluid actuator chamber, and the DP sensors 326 preferably include suitable processing circuitry to calculate the differential fluid pressure from the individual sensed fluid pressures.

The position sensors 328 are each configured to sense the position of the associated actuator 318 and supply an actuator position signal 334 representative of the sensed position to the control 306. It will be appreciated that the actuator position signal 334 is also representative of, and may indeed be scaled to, the position of the flight control surface 310. Thus, it may additionally be appreciated that in some embodiments the actuator position sensors 328 may be replaced with one or more sensors that directly sense the position of the flight control surface 310. In any case, it will be appreciated that the one or more position sensors 328, whether configured to sense actuator position or flight control surface position directly, may be implemented using any one of numerous position sensors now known or developed in the future.

The control 306 is coupled to receive the position command signals 314 from the inceptor system 302, the differential pressure signals 332 from the actuator assemblies 304, and the flight control surface position signals 334 from either the actuator assemblies 304 or the flight control surface 310. The control 306 is configured to process these signals 314, 332, 334 and generate a plurality of substantially equal actuator commands 336. The actuator commands 336 are supplied to the actuator assemblies 304, and more specifically, at least in the depicted embodiment, to the servo control valves 316, to control the supply of pressurized hydraulic fluid to and from the actuator 318. Because the actuator commands 336 supplied to the actuator assemblies 304 are at least substantially equal, any potential force fight between the actuator assemblies 304, both during movement of the flight control surface 310 or when the flight control surface 310 is static, is mitigated or even eliminated. As FIG. 3 depicts, the control 306 implements what is referred to herein as a force fight mitigation function 350. It is the force fight mitigation function 350 that provides for the generation of the substantially equal actuator commands 336. A particular preferred implementation of the force fight mitigation function 350 will be described further below. Before doing so, however, a particular configuration of the control 306 will be described.

With continued reference to FIG. 3, it is seen that each of the controls 306, at least in the depicted embodiment, includes a plurality of actuator control modules 338 (e.g., 338-1, 338-2) and a flight control module 342. This is, of course, merely one example as to how each control 306 could be configured, and that various other configurations could be implemented. Nonetheless, in the depicted embodiment each of the actuator control modules 338, which may also be referred to as actuator control electronics (ACE) modules, is coupled to receive one of the position command signals 314 from the inceptor system 302, the differential pressure signals 332 from one of the actuator assemblies 304, and the flight control surface position signals 334 either from one of the actuator assemblies 304 or from the flight control surface 310. The actuator control modules 338 in turn supply these signals 314, 332, 334 to the flight control module 342.

Figure 4:
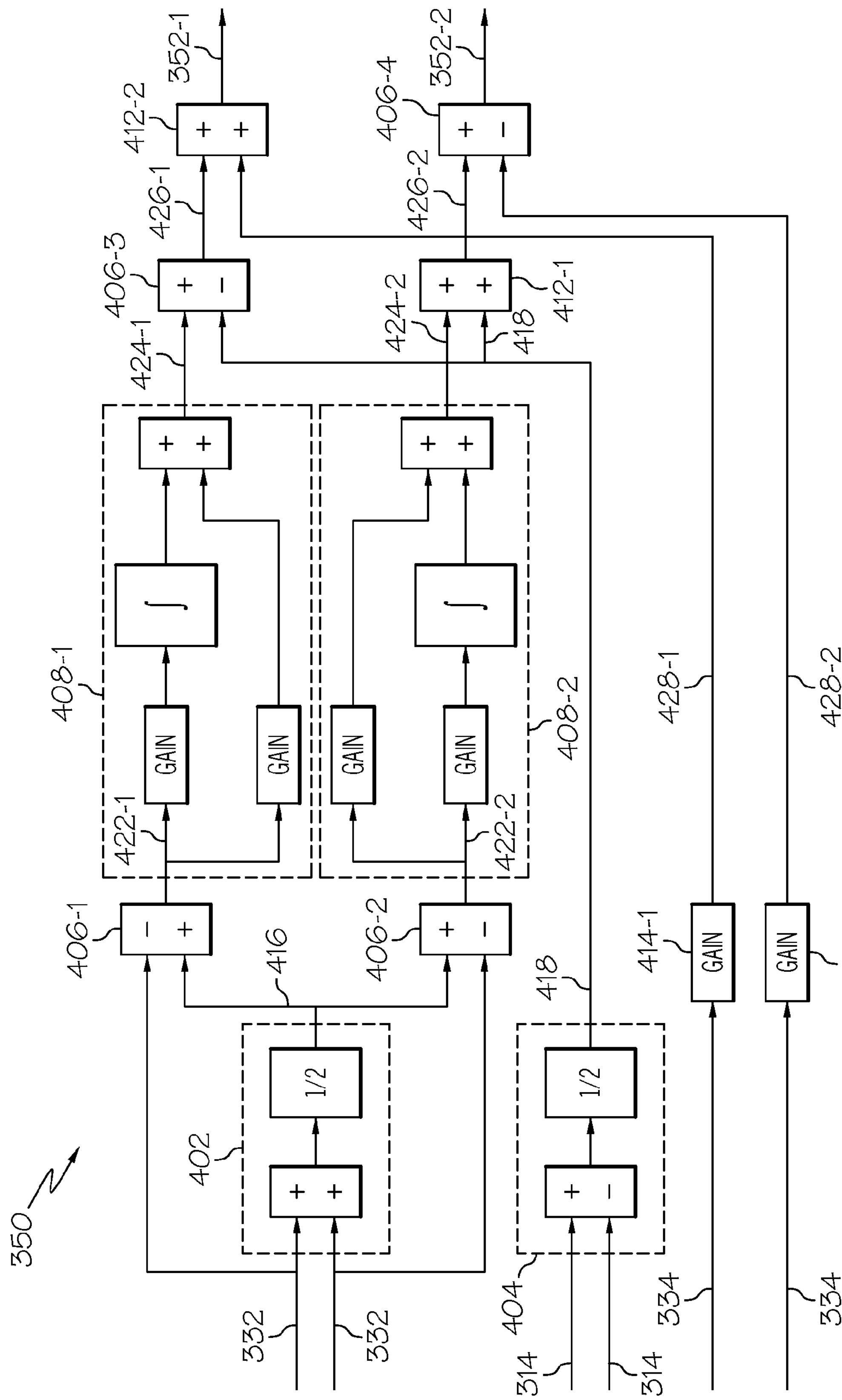
FIG. 4 depicts a function block diagram of an exemplary force fight mitigation function that may be implemented in the exemplary flight control surface actuation system of FIG. 2.

The flight control module 342, and more specifically to the force fight mitigation function 350, processes the position command signals 314, the differential pressure signals 332, and the flight control surface position signals 334, and generates and supplies force fight command signals 352 (352-1, 352-2) to the actuator control modules 338. Each of actuator control modules 338 combines the force fight command signals 352 it receives from the flight control module 342 with the position command signals 314 it receives from the inceptor system 302 to generate and supply actuator commands 336 to the appropriate actuator assembly 304. As noted above, the actuator command 336 supplied to one actuator 304-1 will be equal, or at least substantially equal, to the actuator command 336 supplied to the other actuator 304-1. As was noted above, the force fight mitigation function 350 provides for the generation of the substantially equal actuator commands 336. A particular preferred implementation of the force fight mitigation function 350 is depicted in FIG. 4, and with reference thereto will now be described The force fight mitigation function 350 includes a DP averaging function 402, a position command averaging function 404, first, second, third, and fourth subtraction functions 406-1, 406-2, 406-3, and 406-4, first and second proportional-plus-integral (PI) control paths 408-1, 408-2, first and second addition functions 412-1, 412-2, and first and second gain functions 414-1, 414-2. The DP averaging function 402 is coupled to receive the differential pressure signals 332 and is configured to supply a value 416 representative of the average of the sensed differential fluid pressures. It will be appreciated that the DP averaging function 402 may generate the value 416 representative of the average of the sensed differential fluid pressures using various techniques. For example, the DP averaging function 402 may determine the mathematical difference between the sensed differential pressures and divide the determined mathematical difference by two. Alternatively, it may determine the mathematical sum of the sensed differential pressures and divide the determined mathematical sum by two.

The position command averaging function 404 is coupled to receive the position command signals 314 from the user interface system 202, and is configured to supply a value 418 representative of the average of the position command signals. It will be appreciated that the position command averaging function 404, like the DP averaging function 402, may generate the value 418 representative of the average of the position command signals using various techniques. For example, the position command averaging function 404 may determine the mathematical difference between the position command signals and divide the determined mathematical difference by two. Alternatively, it may determine the mathematical sum of the position command signals and divide the determined mathematical sum by two.

The first and second subtraction functions 406-1, 406-2 are each coupled to receive one of the differential fluid pressure signals 332 and the value 416 representative of the average of the sensed differential fluid pressures. The first and second subtraction functions 406-1, 406-2 are each configured to determine the mathematical difference between the sensed differential pressure and the value representative of the average of the sensed differential fluid pressures and supply a value representative of this determined mathematical difference. These determined mathematical differences, which are referred to herein as differential fluid pressure offsets 422-1, 422-2, are supplied one each to the PI control paths 408-1, 408-2.

The PI control paths 408-1, 408-2 are each coupled to receive one of the differential fluid pressure offsets 422-1, 422-2, and are each configured to supply differential pressure equalization output signals 424-1, 424-2. The PI control paths 408 each include an integral path and a proportional path. The integrals paths provide long term control of the differences in fluid differential pressure between the actuator assemblies 304, driving the DP to the average value. Each integral path also preferably eliminates any tolerances in the control electronics and any mechanical offsets in the actuator assemblies 304. Although the integral paths are able to effectively mitigate steady state force fights, these paths are unable to keep up with dynamic flight control surface movements. The proportional paths, however, compensate for high rate pressure changes during such movements.

The differential pressure equalization output signal 424-1 from one of the PI control paths 408-1 is supplied to the third subtraction function 406-3, and the differential pressure equalization output signal 424-2 from the other PI control path 408-2 is supplied to the first addition function 412-1. The value 418 representative of the average of the position command signals is supplied to both the third subtraction function 406-3 and the first addition function 412-1. Thus, the value 418 representative of the average of the position command signals is mathematically subtracted from one of the differential pressure equalization output signals 424-1 to generate a first equalization output signal 426-1, and is mathematically added to the other differential pressure equalization output signal 424-2 to generate a second equalization output signal 426-2.

The first and second equalization output signals 426-1, 426-2 are supplied to the second addition function 412-2 and the fourth subtraction function 406-4, respectively. The second addition function 412-2 and the fourth subtraction function 406-4 also each receive an actuator/flight control surface position equalization command signal 428 (e.g., 428-1, 428-2). The outputs of the second addition function 412-2 and the fourth subtraction function 406-4 are the above-described force fight command signals 352-1, 352-2 that are supplied to the actuator control modules 338-1, 338-2. The actuator surface position equalization command signals 428-1, 428-2 are supplied from the first and second gains 414-1, 414-2. The first and second gains 414-1, 414-2 are responsive to the one or more flight control surface position signals 334 in a manner, and for reasons, that will now be described.

Various system components and associated tolerances are relatively significant contributors to the force fight between actuator assemblies 304 coupled to the same flight control surface 310. A reduction in component tolerances would, more than likely, lead to higher component price. As an alternate approach, the effect of the system rigging was investigated. That is, the static offsets between the actuator assemblies 304 associated with a common flight control surface 310 were measured at the zero deflection (or null) position, and at the two extreme flight control surfaced actuation positions. These measured offsets are recorded and used to generate, via interpolation, additional actuator surface position equalization command signals 428-1, 428-2. Hence, the first and second gains 414-1, 414-2, which may be implemented using a look-up table, for example, supplies the actuator surface position equalization command signals 428-1, 428-2 based on the one or more flight control surface position signals 334. The actuator surface position equalization command signals 428-1, 428-1 are supplied, in a feed forward manner, to the second addition function 412-2 and the fourth subtraction function 406-4 to generate the force fight command signals 352-1, 352-2. As may be readily apparent to the skilled artisan, the force fight command signals 352-1, 352-2 that are generated will be equal in magnitude and opposite in sign.

Before proceeding further, it is noted that FIG. 4 depicts two gains 412-1, 412-2 that each receive a position feedback signal 334 from separate position sensors 328. This, however, is merely exemplary of one embodiment. In other embodiments, as depicted in FIG. 4, the force fight mitigation function 350 could be implemented using a single gain 412 having a single position signal 334 as an input. This is possible because of the relatively high accuracy associated with the position sensors 328 that are used to sense actuator or flight control surface position, as the case may be.

It was previously noted that for some aircraft, such as the one depicted in FIG. 1, three primary flight control surface actuator assemblies may be coupled to a single flight control surface, such as the rudder 104. A functional block diagram of a portion of the flight control actuation system associated with a primary flight control surface to which three actuator assemblies are coupled is depicted in FIG. 6. This system portion includes also an inceptor system 302, a plurality of actuator assemblies 304 (e.g., 304-1, 304-2, 304-3), and a control 306. It will be appreciated that this portion of the primary flight control system operates substantially identical to the one depicted in FIG. 3, and thus includes like reference numerals to refer to like parts of FIG. 3. The major difference, of course, is that the system portion depicted in FIG. 6 includes an additional processing channel associated with the additional actuator assembly 304-3. Because the overall operation of this system portion is substantially identical to that of the one depicted in FIG. 3, the skilled artisan will readily appreciate that a detailed description of this system portion need not be repeated.

Figure 7:
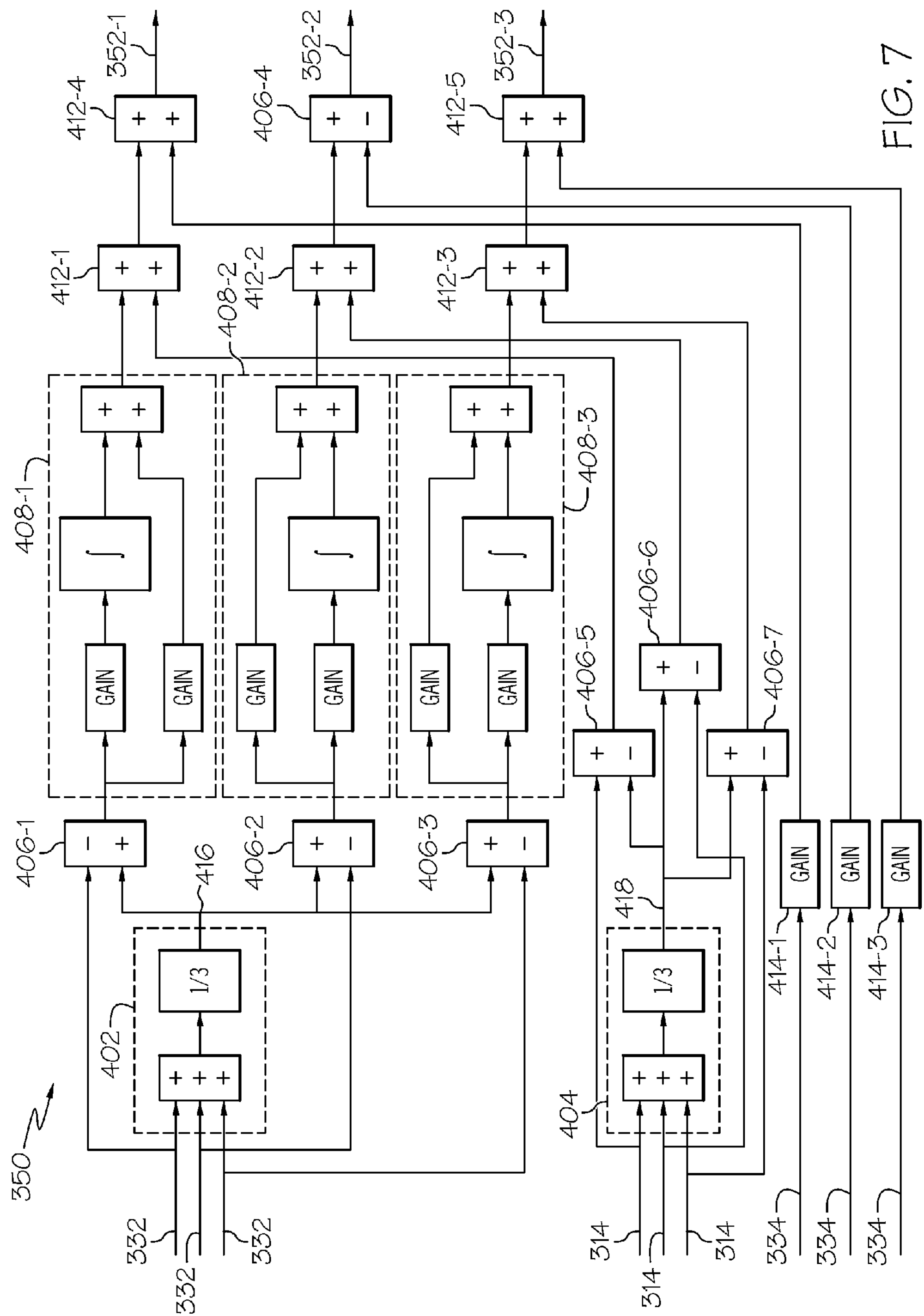
FIG. 7 depicts a function block diagram of another exemplary force fight mitigation function that may be implemented in the exemplary flight control surface actuation system of FIG. 2.

The additional actuator assembly 304-3, and its associated processing channel, does result in the force fight mitigation function 350 being slightly modified from the one depicted in FIG. 4 and described above. In particular, as FIG. 7 depicts, the force fight mitigation function 350 for this system portion includes the DP averaging function 402, the position command averaging function 404, first, second, third, fourth, fifth, sixth, and seventh subtraction functions 406-1, 406-2, 406-3, 406-4, 406-5, 406-6, 406-7, first, second, and third proportional-plus-integral (PI) control paths 408-1, 408-2, and 408-3, first, second, third, fourth, and fifth addition functions 412-1, 412-2, 412-3, 412-4, and 412-5, and first, second, and third gain functions 414-1, 414-2, and 414-3. The overall operation of the three-channel force fight mitigation function 350 depicted in FIG. 7 is substantially identical to that of the one depicted in FIG. 4. As such, the skilled artisan will readily appreciate that a detailed description of this embodiment of the force fight mitigation function 350 need not be repeated. As may be readily apparent to the skilled artisan, the force fight command signals 352-1, 352-2, 352-3 that are generated in this embodiment will be such that the sum of two of the force fight command signals will be equal in magnitude and opposite in sign to that of the remaining force fight command signal. In other words, the force fight command signals 352-1, 352-2, 352-3 will mathematically sum to zero.

Figure 5:
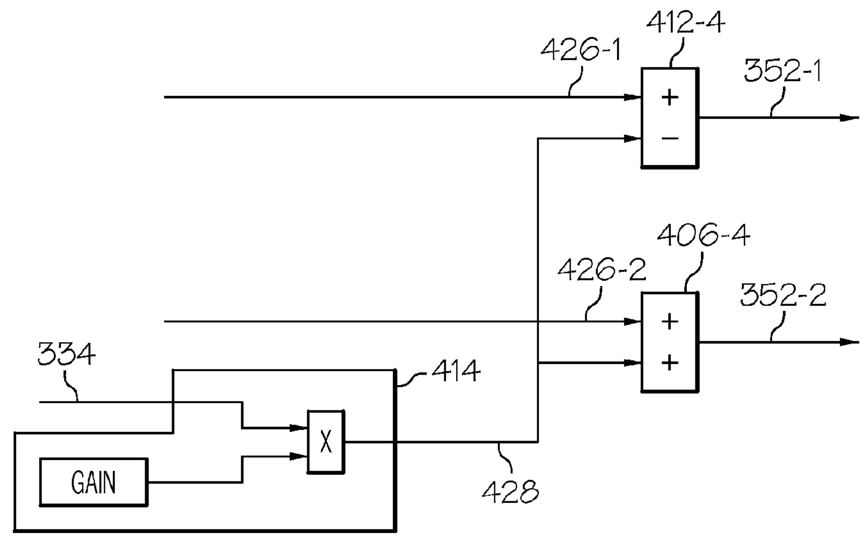
FIG. 5 depicts an alternative embodiment of a portion of the exemplary force fight mitigation function depicted in FIG. 4.
Figure 8:
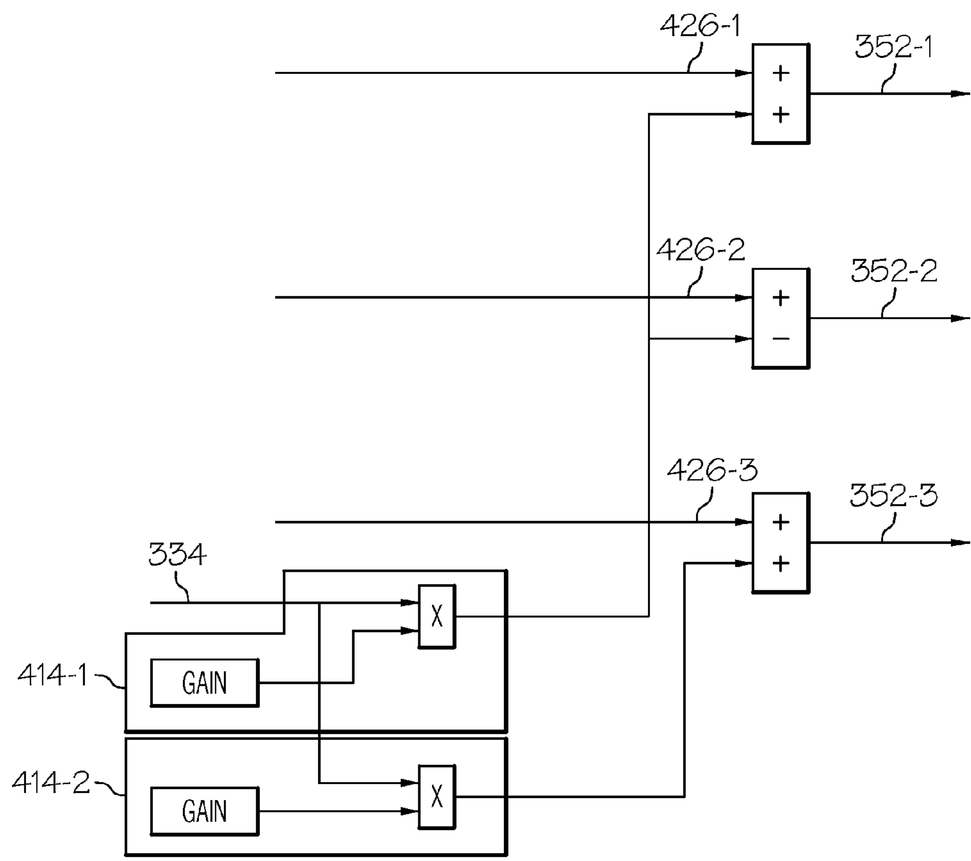
FIG. 8 depicts an alternative embodiment of a portion of the exemplary force fight mitigation function depicted in FIG. 7.

Just as the two-channel force fight mitigation function 350 depicted in FIG. 4 included two gains that each receive a position feedback signal 334 from separate position sensors 328, the three-channel force fight mitigation function 350 depicted in FIG. 5 includes three gains 414-1, 414-2, 414-3 that each receive a position feedback signal 334 from separate position sensors 328. This, however, is merely exemplary of one embodiment. In other embodiments, as depicted in FIG. 8, the three-channel force fight mitigation function 350 could be implemented using two gains 414-1, 414-2 that each have the same, single position signal 334 as an input. Again, this is possible because of the relatively high accuracy associated with the position sensors 328 that are used to sense actuator or flight control surface position, as the case may be.

The system and method described herein prevent, or at least mitigate, the resultant force fights that can occur between actuators when flight control surface actuation system channels are configured in an active-active (or active-active-active) operational configuration While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight control surface actuation system, comprising:

a plurality of differential pressure (DP) sensors, each DP sensor configured to sense a differential fluid pressure across a hydraulically-operated actuator and supply a differential pressure signal representative of the sensed differential fluid pressure;

a plurality of user interface sensors, each user interface sensor configured to sense movement of a user interface and supply a position command signal representative of the sensed movement;

a position sensor configured to sense flight control surface position and supply a flight control surface position signal representative of the sensed flight control surface position;

a flight control module coupled to receive the differential pressure signals, the position command signals, and the flight control surface position signal, the flight control module configured to process these signals and generate a plurality of force fight command signals; and a plurality of actuator controls, each actuator control coupled to receive one of the force fight command signals and one of the position command signals and configured, in response to these signals, to supply a plurality of substantially equal actuator commands, wherein the flight control module comprises a force fight mitigation function that comprises:

a DP averaging function coupled to receive the differential pressure signals and configured, upon receipt thereof, to supply a value representative of an average of the sensed differential fluid pressures;

a plurality of subtraction functions, each subtraction function coupled to receive one of the differential fluid pressure signals and the value representative of the average of the sensed differential fluid pressures and configured, upon receipt thereof, to supply a plurality of differential fluid pressure offsets;

a plurality of proportional-plus-integral (PI) control paths, each PI control path coupled to receive one of the differential fluid pressure offsets and configured, upon receipt thereof, to supply a differential pressure equalization output signal;

a position command averaging function coupled to receive the position command signals and configured, upon receipt thereof, to supply a value representative of an average of the position command signals;

a plurality of gains, each gain coupled to receive the flight control surface position signal and configured, upon receipt thereof, to supply an actuator surface position equalization command signal; and mathematical logic coupled to receive the differential pressure equalization output signals, the value representative of the average of the position command signals, and the actuator surface position equalization command signals and configured, upon receipt thereof, to supply the plurality of force fight command signals.

2. The system of claim 1, wherein:

the flight control module supplies a first force fight command signal and a second force fight command signal; and the first and second force fight command signals are equal in magnitude and opposite in sign.

3. The system of claim 1, wherein:

the flight control module supplies a first force fight command signal, a second force fight command signal, and a third force fight command signal; and the first, second, and third force fight command signals mathematically sum to zero.

4. The system of claim 3, wherein:

the sum of two of the force fight command signals will be equal in magnitude and opposite in sign to that of the remaining force fight command signal.

5. A flight control surface actuation system, comprising:

a plurality of hydraulically-operated actuators, each actuator coupled to receive an actuator command and adapted to receive a flow of hydraulic fluid, each actuator configured, upon receipt of the actuator command, to move a flight control surface to a position;

a plurality of differential pressure (DP) sensors, each DP sensor configured to sense a differential fluid pressure across one of the hydraulically-operated actuator and supply a differential pressure signal representative of the sensed differential fluid pressure;

an inceptor configured to receive user input and, upon receipt of the user input, to move to a control position;

a plurality of user interface sensors, each user interface sensor configured to sense movement of the inceptor and supply a position command signal representative of the control position;

a position sensor configured to sense the position of the flight control surface and supply a flight control surface position signal representative thereof;

a flight control module coupled to receive the differential pressure signals, the position command signals, and the flight control surface position signal, the flight control module configured to process these signals and generate a plurality of force fight command signals for supply to the actuators; and a plurality of actuator controls, each actuator control coupled to receive one of the force fight command signals and one of the position command signals and configured, in response to these signals, to supply a plurality of substantially equal actuator commands, wherein the flight control module comprises a force fight mitigation function that comprises:

a DP averaging function coupled to receive the differential pressure signals and configured, upon receipt thereof, to supply a value representative of an average of the sensed differential fluid pressures;

a plurality of subtraction functions, each subtraction function coupled to receive one of the differential fluid pressure signals and the value representative of the average of the sensed differential fluid pressures and configured, upon receipt thereof, to supply a plurality of differential fluid pressure offsets;

a plurality of proportional-plus-integral (PI) control paths, each PI control path coupled to receive one of the differential fluid pressure offsets and configured, upon receipt thereof, to supply a differential pressure equalization output signal;

a position command averaging function coupled to receive the position command signals and configured, upon receipt thereof, to supply a value representative of an average of the position command signals;

a plurality of gains, each gain coupled to receive the flight control surface position signal and configured, upon receipt thereof, to supply an actuator surface position equalization command signal; and mathematical logic coupled to receive the differential pressure equalization output signals, the value representative of the average of the position command signals, and the actuator surface position equalization command signals and configured, upon receipt thereof, to supply the plurality of force fight command signals.

6. The system of claim 5, wherein:

the flight control module supplies a first force fight command signal and a second force fight command signal; and the first and second force fight command signals are equal in magnitude and opposite in sign.

7. The system of claim 5, wherein:

the flight control module supplies a first force fight command signal, a second force fight command signal, and a third force fight command signal; and the first, second, and third force fight command signals mathematically sum to zero.

8. The system of claim 7, wherein:

the sum of two of the force fight command signals will be equal in magnitude and opposite in sign to that of the remaining force fight command signal.

9. A method of mitigating a force fight between hydraulically-operated actuators that are coupled to a single flight control surface, the method comprising the steps of:

sensing differential fluid pressure across each hydraulically-operated actuator;

sensing a position of a user interface using a plurality of user interface position sensors;

sensing flight control surface position using one or more position sensors;

generating a plurality of force fight command signals from the sensed differential pressures, the sensed user interface positions, and the sensed flight control surface position; and combining each of the force fight command signals with one of the sensed user interface positions to generate a plurality of substantially equal actuator commands, wherein the step of generating the plurality of force fight command signals comprises:

determining an average of the sensed differential fluid pressures;

subtracting each of the sensed differential fluid pressures from the determined average of the sensed differential fluid pressures, to thereby generate a plurality of differential fluid pressure offsets;

processing each of the differential fluid pressure offsets through a proportional-plus-integral (PI) control path, to thereby generate differential pressure equalization output signals;

determining an average of the sensed user interface positions;

generating a plurality of actuator surface position equalization commands from the flight control surface position signal; and generating the plurality of force fight command signals from the differential pressure equalization output signals, the average of the sensed user interface positions, and the actuator surface position equalization command signals.

10. The method of claim 9, wherein:

the plurality of force fight command signals comprise a first force fight command signal and a second force fight command signal; and the first and second force fight command signals are equal in magnitude and opposite in sign.

11. The method of claim 9, wherein:

the plurality of force fight command signals comprise a first force fight command signal, a second force fight command signal, and a third force fight command signal; and the first, second, and third force fight command signals mathematically sum to zero.

12. The method of claim 11, wherein:

the sum of two of the force fight command signals will be equal in magnitude and opposite in sign to that of the remaining force fight command signal.

* * * * *